(12) United States Patent
Dynomant et al.

(10) Patent No.: US 11,907,159 B2
(45) Date of Patent: Feb. 20, 2024

(54) METHOD FOR REPRESENTING A DISTRIBUTED COMPUTING SYSTEM BY GRAPH EMBEDDING

(71) Applicant: BULL SAS, Les Clayes-sous-Bois (FR)

(72) Inventors: Emeric Dynomant, Grenoble (FR); Pierre Seroul, Sinard (FR)

(73) Assignees: BULL SAS, Les Clayes-sous-Bois (FR); LE COMMISSARIAT À L'ÉNERGIE ATOMIQUE ET AUX ÉNERGIES ALTERNATIVES, Paris (FR)

( * ) Notice: Subject to any disclaimer, the term of this patent is extended or adjusted under 35 U.S.C. 154(b) by 0 days.

(21) Appl. No.: 17/891,095

(22) Filed: Aug. 18, 2022

(65) Prior Publication Data

US 2023/0055902 A1 Feb. 23, 2023

(30) Foreign Application Priority Data

Aug. 19, 2021 (EP) .................................... 21192194

(51) Int. Cl.
*G06F 15/80* (2006.01)
*G06F 11/30* (2006.01)
*G06F 11/34* (2006.01)

(52) U.S. Cl.
CPC ...... *G06F 15/8092* (2013.01); *G06F 11/3006* (2013.01); *G06F 11/3447* (2013.01)

(58) Field of Classification Search
CPC ............. G06F 11/3006; G06F 11/3447; G06F 11/3476; G06F 15/8092
See application file for complete search history.

(56) References Cited

U.S. PATENT DOCUMENTS

| 11,093,518 | B1 | 8/2021 | Lu et al. |
| 2017/0075744 | A1 | 3/2017 | Deshpande et al. |
| 2020/0145441 | A1* | 5/2020 | Patterson ............ G06F 16/9024 |
| 2021/0014127 | A1* | 1/2021 | Iyengar .................. H04L 41/12 |
| 2022/0334906 | A1* | 10/2022 | Patil ..................... G06F 11/3438 |

OTHER PUBLICATIONS

European Search Report issued in EP21192194.5 dated Feb. 8, 2022 (9 pages).

* cited by examiner

*Primary Examiner* — Zachary K Huson
(74) *Attorney, Agent, or Firm* — ARC IP Law, PC; Joseph J. Mayo

(57) ABSTRACT

A method of representing a distributed computing system, the distributed computing system comprising a plurality of processing devices connected together according to a predefined topology. The method comprising receiving at least one piece of data from an activity log file relating to at least one processing device among the plurality of processing devices, receiving at least one metric relating to at least one processing device among the plurality of processing devices, receiving at least the predefined topology of the distributed computing system, constructing a graph representative of a distributed computing system operation, the graph comprising the data item extracted from the received log file, the received metric, and the received topology, and embedding at least one part of the graph to obtain at least one state vector representing the at least one part of the embedded graph.

12 Claims, 2 Drawing Sheets

METHOD FOR REPRESENTING A DISTRIBUTED COMPUTING SYSTEM BY GRAPH EMBEDDING

This application claims priority to European Patent Application Number 21192194.5, filed 19 Aug. 2021, the specification of which is hereby incorporated herein by reference.

BACKGROUND OF THE INVENTION

Field of the Invention

The technical field of one or more embodiments of the invention is that of distributed computing systems.

One or more embodiments of the invention relate to a method of representing a distributed computing system, a maintenance method based on this representation, and an associated representation device and in particular a representation method wherein the distributed computing system is represented by a graph and in which a graph embedding yields a state vector of the system, the state vector then being able to be presented as an input to a maintenance method of the distributed computing system.

Description of the Related Art

Throughout the description, a distributed computing system will be understood to be a complex computer system comprising several machines allowing the distribution of work between the different machines, and allowing in particular the parallelization of related sub-tasks of a given service. Throughout the description, we will refer to a machine, a compute node, a compute blade or a processing device. For example, corporate server farms and high-performance computers, also known as HPCs (High-Performance Computers), are distributed computing systems. These distributed computing systems, also known as computing clusters, may comprise thousands of machines.

Incidents on this type of equipment are very detrimental to end users: slow and complicated rebooting, increased energy consumption, loss of services, etc., and their prediction and/or detection of these incidents enables the administrative team to anticipate or improve the resolution of these problems, thus improving quality of service for end users.

Solutions such as a CDC, for "Cognitive Data Center", are known. This particular solution is described on the following website https://atos.net/fr/solutions/codex-ai-suite. Such a solution makes it possible to implement incident detection and/or prediction pipelines on this type of equipment. By using system metrics (use of processors, RAM, disk read/writes, energy consumption, etc.) or logs (systems, applications, etc.), anomalies can be detected in real time and reported to administrators.

In computing, a log corresponds to a logging of the activity of a process. This log, or journal, is created by sequentially recording in a file or a database all or part of the activity of the process. A log or journal refers to the file in which these records are saved. These records are dated. For a given log file, different lines can have different semantics. In practice, the term "log" is used to refer to a log file, logging journal, or log line. A log line is a line in a file/journal of logs.

The exclusiveness of the sources of information that are metrics and logs is problematic. Indeed, logs and metrics are just two sides of the same coin: when a machine's hard disk is approaching saturation, the metric indicating 99% disk space usage and the log indicating that saturation is approaching are equivalent in terms of information. However, both have their advantages:

Metrics reflect a physical, measurable reality, with units
Logs can reflect the state of the program itself, from the point of view of the developer who defined those logs It is therefore problematic that anomaly detection projects on complex IT systems such as CDC always focus on only one type of data.

For example, Dynatrace® is monitoring software for a server farm. It was initially designed to be used in cloud environments. However, its use for physical servers still remains the majority for uses involving sensitive data, or when the preservation of data governance is a sensitive issue. In this solution, system metrics are used to detect anomalies on machines, but the logs are used only for the purpose of correlating them with a change in system metrics to help find the root cause of the problem [Anomaly Detection For Monitoring, 2015, Schwartz et al, Dynatrace, O'Reilly]. Thus, logs are not used as input to machine learning models for anomaly detection per se, and thus are not considered for anomaly detection in the same way that system metrics are.

Moreover, in Dynatrace®, the structuring of the logs, for example to extract numerical values in order to constitute a time series, is made according to a log scheme defined by the user. For machines running only one service, for example, an Apache web server, the format of the written logs will be known in advance. However, HPC users often implement scientific research tasks, with specially developed programs, with logs having a different format between two applications, or even between two versions of the same application.

New Relic® is another commercialized solution. Like Dynatrace®, it uses the logs only for the purpose of parallelization with system metrics. Again, this is done to provide a pseudo-automatic search for the root cause of the change in the trend of these indicators. This usage is explained in the solution documentation.

Another solution, Datadog®, like its competitors, uses only system metrics in its incident predictions. However, its log processing and visualization solution is more comprehensive than those presented so far. Although based on a structuring by predefined application templates, the structuring of the log lines also associates a pattern with each log. Thus, a line indicating a change in temperature in a processor could be associated with the model "<COMPONENT> temperature changed from <VALUE> to <VALUE> <UNIT>". This feature allows for better grouping of information and easier navigation through the logs, but does not allow for the inclusion of metrics in the prediction of incidents.

Furthermore, none of these solutions describes taking into account the network topology in their solution. However, this data source could be of great interest in detecting anomalies that propagate from one person to another.

There is therefore a need for a solution that simultaneously takes into account logs, metrics and topology, while having good results in detecting and/or predicting anomalies.

BRIEF SUMMARY OF THE INVENTION

At least one embodiment of the invention offers a solution to the above-mentioned problems, by allowing heterogeneous data to be taken into account, in particular logs, metrics and topology, in a maintenance method, thanks to the construction of a graph and its embedding to obtain a state vector.

One or more embodiments of the invention relate to a method of representing a distributed computing system, the distributed computing system comprising a plurality of processing devices connected together in a predefined topology, the method comprising at least the steps of:

Receiving at least one data item from an activity log file relating to at least one processing device among the plurality of processing devices, Receiving at least one metric related to at least one processing device among the plurality of processing devices, Receiving at least the predefined topology of the distributed computing system, Constructing a graph representative of a distributed computing system operation, the graph comprising the data item extracted from the received log file, the received metric, and the received topology, Embedding at least one part of the graph to obtain at least one state vector representing the at least one part of the embedded graph.

By virtue of at least one embodiment of the invention, it is possible to best represent the operation of a distributed computing system through the construction of a graph. This allows more information to be taken into account than in the state of the art, including the topology of the distributed computing system. The graph is embedded in a space to obtain a state vector representative of the operation of at least part of the distributed computing system for a certain period of time. This state vector can then be used in any maintenance method that accepts a vector as input, and preferentially in one or more embodiments of the invention any maintenance method based on machine learning. Thus, in at least one embodiment, it is possible to perform learning with a vector that is more representative of at least a subset of the distributed computing system than the state of the art, because this vector takes into account topology, metrics and logs, At least one embodiment of the invention makes use of the fact that the arrangement of HPC compute nodes via a network generates a tree shape, with successive levels of network switches S (also called "switches") up to elementary computational units C at the end of the branches, as shown in FIG. 1. This allows the construction of a graph based on the topology, and also taking into account the metrics and logs related to each device of the system.

At least one embodiment of the invention also makes it possible to represent only part of the distributed computing system, and to capture from it what is important thanks to the embedding of the graph into a latent space, that is in a space of decreased dimensions, to obtain a state vector representative of the part of the distributed computing system and its operation. One or more embodiments of the invention can therefore isolate parts of the system to analyze them independently, while taking into account in this analysis all the heterogeneous information received relating to this part of the system.

At least one embodiment of the invention thus improves the results of known maintenance methods that take state vectors as input by working on the provided state vector to best represent the distributed computing system being maintained.

In addition to the features mentioned in the preceding paragraph, the representation method according to at least one embodiment of the invention may have one or more complementary features from the following, taken individually or according to all technically plausible combinations:

the receiving steps are implemented a plurality of times, each implementation being performed during a time window of predetermined duration, the steps of graph construction and graph embedding being performed at the end of each time window, the created graph comprises:

nodes representing users, processing devices, activities and/or log files, edges connecting nodes, where the edges represent links between nodes and are based at least in part on the topology, attributes of nodes and/or edges representing the received metrics, the received topology is sent by an orchestrator, the embedding of at least a part of the graph is carried out by a graph embedding method selected from DyGCN and MAGNN, At least one embodiment of the invention relates to a method of maintaining a distributed computing system, the distributed computing system comprising a plurality of processing devices connected to each other according to a predefined topology, the method comprising at least the steps of the representation method according to one or more embodiments of the invention and furthermore a step of maintaining the distributed computing system by a machine learning method from the state vector. In at least one embodiment, the step of maintaining the distributed computing system is carried out from a plurality of state vectors respectively obtained during each time window of the plurality of time windows. The automated maintenance learning method can further be is at least one of:

an anomaly detection method, an incident prediction method, a root cause analysis method.

At least one embodiment of the invention relates to a device for representing a distributed computing system, the distributed computing system comprising a plurality of processing devices connected together according to a predefined topology, the representation device comprising:

At least one reception module, configured to implement the receiving steps of the representation method according to one or more embodiments of the invention, At least one graph creation module, configured to implement the graph creation step of the representation method according to one or more embodiments of the invention, At least one graph embedding module, configured to implement the graph embedding step of the representation method according to one or more embodiments of the invention, In one or more embodiments, the representation device further comprises a storage module configured to store the at least one state vector from the graph embedding step, the graph embedding module further being configured to send the state vector to the storage module.

At least one embodiment of the invention relates to a computer software package comprising instructions that, when the software is executed by a computer, cause the computer to implement the steps of the representation method according to one or more embodiments of the invention or the steps of the maintenance method according to one or more embodiments of the invention.

At least one embodiment of the invention relates to a computer-readable recording medium comprising instructions that, when the software is executed by a computer, cause the computer to implement the steps of the representation method according to one or more embodiments of the invention or the steps of the maintenance method according to one or more embodiments of the invention.

At least one embodiment of the invention and its different applications will be better understood upon reading the following disclosure and examining the accompanying figures.

BRIEF DESCRIPTION OF THE DRAWINGS

The figures are presented by way of reference and are in no way limiting to the one or more embodiments of the invention.

DETAILED DESCRIPTION OF THE INVENTION

Unless otherwise stated, the same element appearing in different figures has the same reference.

Figure 1:
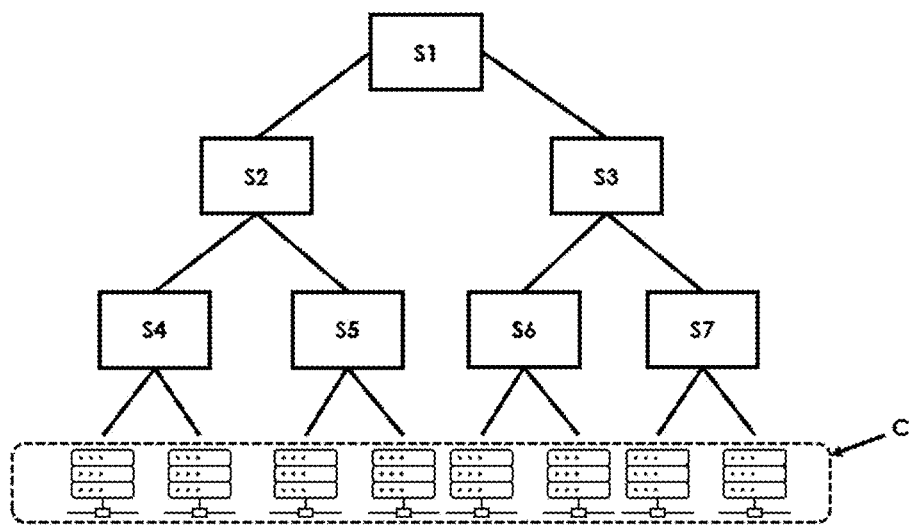
FIG. 1 shows a schematic depiction of a distributed computing system according to the background art.
Figure 2:
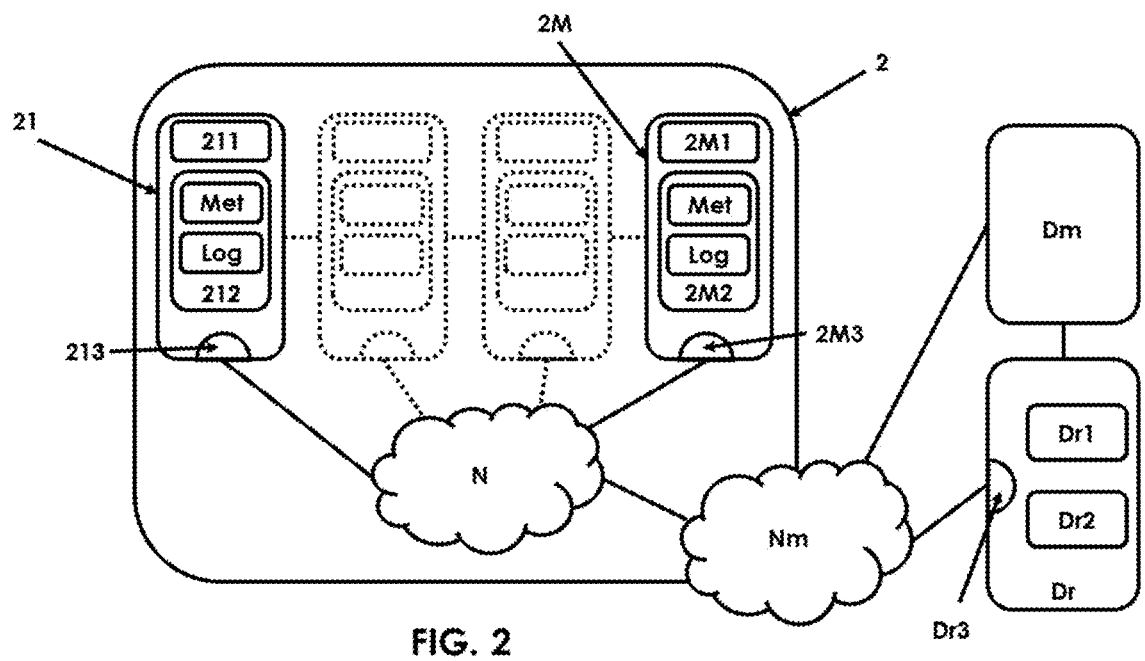
FIG. 2 shows a schematic depiction of a distributed computing system, a representation device according to one or more embodiments of the invention, and a maintenance device according to one or more embodiments of the invention.

FIG. 2 shows a schematic depiction of a distributed computing system, of a representation device according to one or more embodiments of the invention and of a maintenance device according to one or more embodiments of the invention.

The distributed computing system 2 shown in FIG. 2 is the distributed computing system that is the subject of maintenance by a maintenance device Dm. The system 2 and the device Dm are connected by a maintenance network Nm.

The distributed computing system 2 comprises M processing devices 21 through 2M. "Processing device", by way of one or more embodiments, means a device configured to perform tasks assigned to it. For example, a compute blade in a computer cabinet is a processing device. An entire computer cabinet is also a processing device. Within a distributed computing system, a server, a machine, a node, a virtual machine, a "pod" container such as one deployed by a "Kubernetes" solution, a network switch, or a blade are examples of processing devices.

At least one embodiment of the invention is preferentially implemented with several hundreds or thousands of processing devices 21 to 2M, but can also be implemented from two processing devices 21 and 2M, with M being equal to 2. These processing devices 21 to 2M are connected by an interconnection network N.

At least two of the processing devices 21 through 2M, and preferentially all of the processing devices 21 to 2M, comprise at least:

A processing module 211, 2M1, configured to implement instructions. For example, this processing module comprises a processor, a microcontroller, or any other electronic board that allows the implementation of received instructions, A storage module 212, 2M2, configured to store data. The storage module may be or comprise: a hard drive, a Solid-State Drive (SSD), or any other storage medium. The storage modules 212, 2M2 are shown in a unified fashion, but may be multiple logical units distributed across multiple physical devices that are accessed by the processing devices 21 through 2M via the interconnection network N, A network module 213, 2M3, configured to send and receive data via the interconnection network N. This network module is or comprises a network interface, preferentially wired, for example "Ethernet®" or "InfinityBand®", or wireless, for example "Wi-Fi®".

The storage module 212, 2M2 of the processing devices 21, 2M is configured to store at least one metric Met and at least one data item from an activity log file Log. The expressions "log", "log file", "journal" or "journal file" all refer to the same object, described later.

There is a difference between a log file and a metric.

A metric, by way of one or more embodiments, is an indicator of the status of a processing device and/or one of its hardware or software components. This metric can be given for each process, for example the drive access number for the process for which the pid ("process identifier") is 12584. A metric, or metric-type information, therefore associates a date and a value, the interpretation of the value being performed by the nature of the metric.

On the contrary, a line in a log file, or log-like information, is, for example:

2018 Jul. 11 13:20:56 192.168.1.150 GET/favicon.ico-80-192.168.1.106 Mozilla/5.0+(Windows+NT+10.0;+Win64;+x64;+rv:61.0)+Gecko/20100101+Fi refox/6 1.0-200 0 0 15.

In this line, by way of one or more embodiments, the pieces of information are separated by spaces. This line indicates, inter alia, in at least one embodiment, on what date and at what time, and with which method, a file called favicon.ico was requested. This line also indicates, in at least one embodiment, that the response was issued in 15 ms. Such a line is therefore considerably more informative than a simple metric. There are numerous activity logs with varying degrees of verbosity and containing various information. This information is sometimes left to the imagination of the developers.

One or more embodiments of the invention allows both types of information to be processed in its anomaly detection, while taking into account the topology of the distributed computing system 2.

Also shown in FIG. 2, by way of at least one embodiment, are a device Dr for representing the distributed computing system 2 and a device Dm for maintaining the distributed computing system 2. Although FIG. 2 shows these two devices, at least one embodiment of the invention also covers cases where the representation of the system 2 and its maintenance are performed by the same device.

The representation device Dr according to one or more embodiments of the invention makes it possible to prepare the data, which will be passed as input to a maintenance method, to take into account heterogeneous data from the distributed computing system 2. The maintenance device Dm, when not conflated with the representation device Dr, is then responsible for implementing the maintenance of the distributed computing system 2.

The representation device Dr will be presented in more detail later in the description, by way of one or more embodiments.

Figure 3:
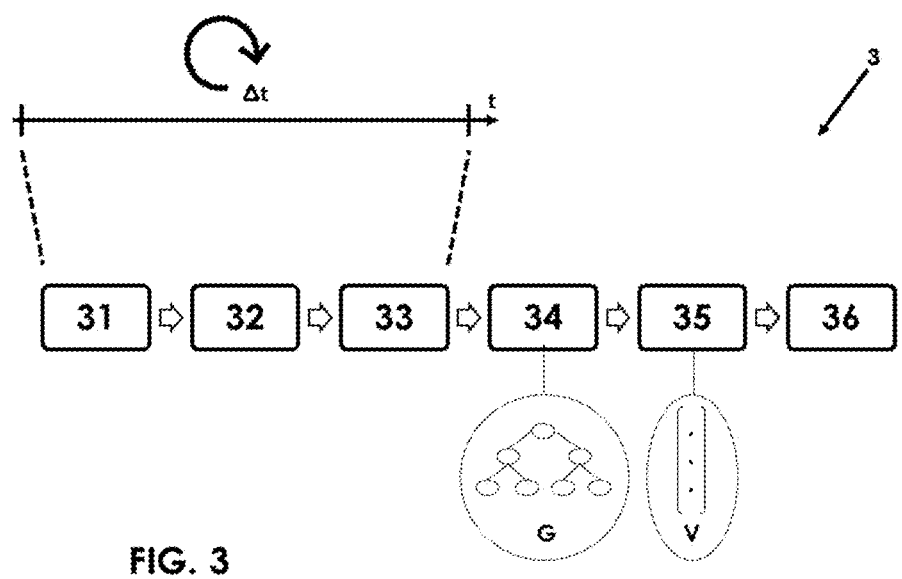
FIG. 3 shows a schematic depiction of a representation method according to one or more embodiments of the invention.

FIG. 3 shows a schematic depiction of a representation method 3 according to one or more embodiments of the invention.

In at least one embodiment, the representation method 3 shown in FIG. 2 comprises 6 steps, but the last step 36 is optional. Thus, the representation method 3 according to one or more embodiments of the invention comprises at least 5 steps. These 5 steps are carried out by the representation device Dr of the distributed computing system 2.

The representation method 3 comprises three steps of receiving data, with a different type of data being received at each stage, according to one or more embodiments. These steps can be merged, that is all three types of data can be received at the same time, or two types of data can be received at the same time and another type of data can be received earlier or later. The three receiving steps can be performed in any order other than the order shown below, according to one or more embodiments of the invention.

The first receiving step, in at least one embodiment, is the step 31 of receiving at least one data item from an activity log file relating to at least one processing device by the processing devices 21 through 2M of the distributed computing system 2. An example of an activity log file of the processing device 21 will be taken. The processing device 21 stores a log file Log or at least one data item from an activity log file in its storage module 212. The processing device 21 may store only one data item from a log file, for example when the activity log file is stored by an external database. At least one embodiment of the invention also covers cases where log files are sent by a centralized system or device, for example a dedicated log database, for example, ElasticSearch®, widely used in the prior art to process logs.

"Data from an activity logging file" means, for example, one line of a log file, several lines of a log file, or the entire log file, or a data item representative of one line of a log file or of the entire log file. "Data representative of one line of a log file or of the entire log file" means any data resulting from an analysis of a log file. "Activity log file data relating to a processing device 21" means that the activity log file data is representative of at least a portion of an activity conducted with or by the processing device 21. "Activity" means a job or part of a job conducted with or by the processing device 21, a job being, for example, a task or part of a task of a service implemented by the distributed computing system 2.

The data item of the activity log file Log, for example a line of the file Log, is sent to the representation device Dr, via the network module 213, at least via the maintenance network Nm, following a request from the representation device Dr or automatically periodically, according to one or more embodiments. Thus, in step 31, which may or may not be merged with steps 32 and 33, the representation device Dr receives at least one data item relating to an activity log file via its network module Dr3.

The representation method 2 comprises receiving steps 32 and 33, which are carried out in the same way as step 31, by way of one or more embodiments.

Step 32, in at least one embodiment, is a step of receiving at least one metric relating to at least one processing device among the processing devices 21 through 2M of the distributed computing system 2. A metric related to at least one processing device is a metric indicating the hardware or software state of the processing device or one or more of its components, or indicating the hardware or software state of a task or part of a task in which the processing device is involved. Metrics are often stored in a time-series database, such as InfluxDB®, from the TICK suite, used in the monitoring of processing devices. At least one embodiment of the invention thus also covers cases where metrics are retrieved from such time-series databases. Thus, in step 32, which may or may not be merged with steps 31 and 33, the representation device receives at least one metric via its network module Dr3, according to one or more embodiments.

Step 33, in at least one embodiment, is a step of receiving at least one predefined topology from the distributed computing system. "Topology" means a set of data or at least one data item representing the links between the different entities of the distributed computing system. The topology is interesting in that if a switch fails, every node it manages will also fail, which allows one or more embodiments of the invention to take this information into account, but also in that the job scheduler maximizes the geographic proximity of the nodes used to perform a job to minimize latency, which is important information to take into account. The network topology can for example be retrieved from an orchestrator (not shown) of the distributed computing system 2, for example an HPC orchestrator such as Slurm®. The same is true for server farms. A software connector to the orchestrator or load balancer can be used to retrieve the topology data, on request or automatically on a periodic basis, for example when the context requires it. Thus, in step 33, which may or may not be merged with steps 31 and 32, the representation device receives the network topology via its network module Dr3.

Once data of all three types is received, in at least one embodiment, the representation method 34 comprises a step of constructing a graph representative of the functioning of the distributed computing system. This graph construction step thus takes into account data from activity log files, metrics, and the topology of the distributed computing system 2 received in steps 31 to 33. The constructed graph comprises:
- nodes representing users, processing devices, activities and/or log files,
- edges connecting nodes, where the edges represent links between nodes and are based at least in part on the topology,
- attributes of nodes and/or edges representing the received metrics.

Figure 4:
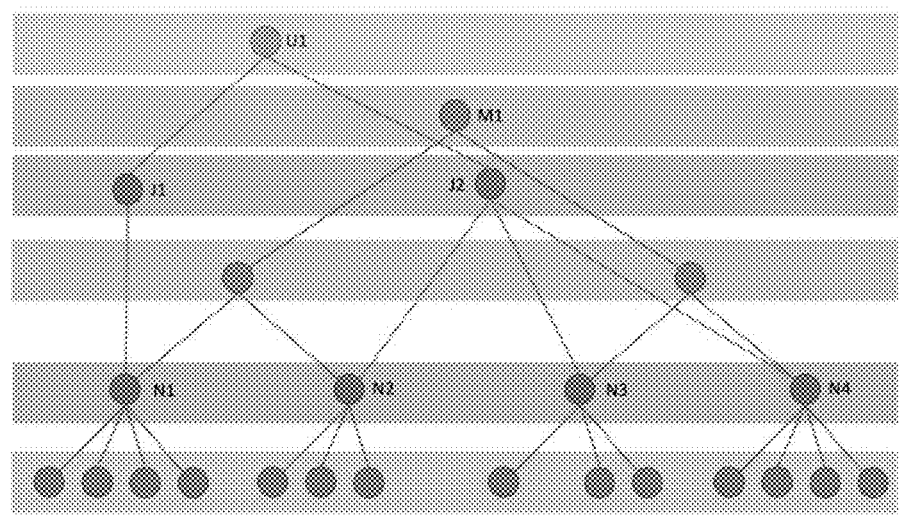
FIG. 4 shows a schematic depiction of a graph constructed according to one or more embodiments of the invention representing a distributed computing system.

Such a constructed graph is shown in FIG. 4, according to one or more embodiments of the invention. As shown in FIG. 4, user U1 has 2 "jobs" (or tasks) running during the acquisition time window. Job J2 uses 3 nodes and job J1 uses only one. Nodes N1 and N4 each wrote 4 logs during the acquisition time window. Nodes N2 and N3 have written 3. FIG. 4 does not show the metrics (embedded as node and/or edge attributes in the constructed graph).

"Graph representative of the functioning of the distributed computing system" means a graph comprising a set of data making it possible to reflect the exchanges and links between entities of the distributed computing system 2 during a given period.

The method 2 according to at least one embodiment of the invention then comprises a step 35 of embedding the graph into a latent space, of reduced dimensions, to obtain a state vector representing the graph. This step 35 can be carried out on a part of the graph, making it possible to represent and analyze only the part of the graph in question. Graph "embedding" allows the digital representation of information contained in "a graph" as vectors. This can be a single node, a relationship between two nodes, or even a subgraph extracted from the parent graph. At least one embodiment of the invention uses embedding to enable a reduction in dimensionality while retaining the data needed to maintain the distributed computing system 2, all in a format understood by known maintenance methods, preferentially by machine learning. Indeed, these methods take as input a vector and one or more embodiments of the invention makes it possible to provide this vector, created automatically and comprising heterogeneous information: numerical information (metrics of the processing devices), textual information (the logs written by each processing device) and spatial information (the network topology), thus making it possible to improve the methods relating to the maintenance of these systems without modifying these methods themselves. These methods, preferentially machine learning methods but not exclusively so, can be:

an anomaly detection method,
an incident prediction method,
a root cause analysis (RCA) method.

Known graph embedding methods can be used, for example DyGCN, described in [Cui et al., DyGCN: Dynamic Graph Embedding with Graph Convolutional Network, 2021, doi: 10.1145/3366423.3380297] and MAGNN, described in [Fu et al., MAGNN: Metapath Aggregated Graph Neural Network for Heterogeneous Graph Embedding, 2020, doi: 10.1145/1122445.1122456]. These two methods are particularly interesting in that they can be used to:

take into account, when representing graph N during a certain time interval, the previous states at the previous time intervals of this graph N-1, N-2, ..., N-m. Indeed, the state of the HPC at a time t will depend on its state at t-1, t-2, ..., t-m and one or more embodiments of the invention makes it possible to take this information into account.

potentially represent a complete subgraph. As shown in FIG. 4, a "job" is a subgraph of compute nodes and their associated logs, a user is a set of jobs, and even a single compute node is represented by the subgraph of that node and its logs, written during that time window. At least one embodiment of the invention again allows all this information to be taken into account in the future maintenance of the distributed computing system 2.

One or more embodiments of the invention can use any graph embedding method that can:

take into account, at the representation of the graph N during a certain time interval, the previous states at the previous time intervals of this graph N-1, N-2, ..., N-m.

represent a complete subgraph.

The method 2 according to one or more embodiments of the invention is preferentially carried out a plurality of times, as shown in FIG. 2. Each implementation is performed during a time window of predetermined duration Δt, with the graph constructions 34 and graph embedding 35 steps being carried out at the end of each time window for the time window that has just elapsed. A time window according to one or more embodiments of the invention can for example last 5 minutes. Carrying out the steps of receiving and constructing the graph and embedding the graph a plurality of times makes it possible to take into account the previous states of the graph and thus of the distributed computing system 2, especially when subsequent maintenance is performed by machine learning.

The representation method 3, in at least one embodiment, may optionally comprise an additional step 36 of storing the state vector obtained as a result of the step 35 of embedding at least a portion of the graph. This makes it possible to have a history of the state vectors at several points in time, for example, to re-train the model more quickly in the machine learning method. This allows a simple interconnection with maintenance methods used by the maintenance device Dm.

At least one embodiment of the invention also relates to a method (not shown) of maintaining the distributed computing system 2.

This maintenance method comprises the steps of the representation method 3 according to one or more embodiments of the invention and an additional step of maintaining the distributed computing system by a machine learning method from the state vector. This maintenance step can be performed from a plurality of vectors when the steps of the representation method 2 have been carried out a plurality of times during the plurality of time windows.

The maintenance method can be implemented by the maintenance device Dm or by a single device not shown performing both the representation of the distributed computing system 2 and its maintenance, according to one or more embodiments of the invention.

The invention claimed is:

1. A method of representing a distributed computing system, the distributed computing system comprising a plurality of processing devices connected together in a predefined topology, the method comprising:

receiving at least one piece of data from an activity log file relating to at least one processing device among the plurality of processing devices, receiving at least one metric related to said at least one processing device among the plurality of processing devices, receiving at least the predefined topology of the distributed computing system, constructing a graph representative of a distributed computing system operation, the graph comprising the at least one piece of data extracted from the activity log file that is received, the at least one metric that is received, and the predefined topology that is received, embedding at least one part of the graph to obtain at least one state vector representing the at least one part of the graph that is embedded, the at least one state vector taking into account the predefined topology, the at least one metric and the activity log file.

2. The method of representing according to claim 1, wherein the receiving the at least one piece of data, the receiving the at least one metric and the receiving the predefined topology are implemented a plurality of times, each implementation being performed during a time window of predetermined duration, and wherein the constructing the graph and the embedding the at least one part of the graph are carried out at an end of each time window.

3. The method of representing according to claim 1, wherein the graph that is constructed comprises nodes representing one or more of users, processing devices, activities and log files, edges connecting said nodes, where the edges represent links between said nodes and are based at least in part on the predefined topology, attributes of one or more of said nodes and said edges representing the at least one metric that is received.

4. The method of representing according to claim 1, wherein the predefined topology that is received is sent by an orchestrator.

5. The method of representing according to claim 1, wherein the embedding of the at least a portion of the graph is performed by a graph embedding method selected from DyGCN and MAGNN.

6. The method of representing according to claim 1, further comprising maintaining the distributed computing system by a machine learning method from the at least one state vector.

7. The method of representing according to claim 6, wherein said maintaining the distributed computing system is carried out from a plurality of state vectors respectively obtained during each time window of a plurality of time windows.

8. The method of representing according to claim 6, wherein the machine learning method is at least one method selected from
an anomaly detection method,
an incident prediction method,
a root cause analysis method.

9. A device for representing a distributed computing system, the distributed computing system comprising a plurality of processing devices connected together in a predefined topology, the device comprises:
at least one receiver, wherein the at least one receiver is configured to
receive at least one piece of data from an activity log file relating to at least one processing device among the plurality of processing devices,
receive at least one metric related to said at least one processing device among the plurality of processing devices,
receive at least the predefined topology of the distributed computing system,
at least one graph creator, wherein the at least one graph creator is configured
construct a graph representative of a distributed computing system operation, the graph comprising the at least one piece of data extracted from the activity log file that is received, the at least one metric that is received, and the predefined topology that is received,
at least one graph embedding network, wherein the at least one graph embedding network is configured to embed at least one part of the graph to obtain at least one state vector representing the at least one part of the graph that is embedded, the at least one state vector taking into account the predefined topology, the at least one metric and the activity log file.

10. The device according to claim 9, further comprising a storage configured to store the at least one state vector from the embed said at least one part of the graph, wherein the at least one graph embedding network is further configured to send the at least one state vector to the storage.

11. A non-transitory computer-readable medium comprising instructions that, when software is executed by a computer, cause the computer to implement a method of representing a distributed computing system, the distributed computing system comprising a plurality of processing devices connected together in a predefined topology, the method comprising:
receiving at least one piece of data from an activity log file relating to at least one processing device among the plurality of processing devices,
receiving at least one metric related to said at least one processing device among the plurality of processing devices,
receiving at least the predefined topology of the distributed computing system,
constructing a graph representative of a distributed computing system operation, the graph comprising the at least one piece of data extracted from the activity log file that is received, the at least one metric that is received, and the predefined topology that is received,
embedding at least one part of the graph to obtain at least one state vector representing the at least one part of the graph that is embedded, the at least one state vector taking into account the predefined topology, the at least one metric and the activity log file.

12. The non-transitory computer-readable medium according to claim 11, further comprising a computer program product.

* * * * *